United States Patent Office 3,468,472
Patented Sept. 23, 1969

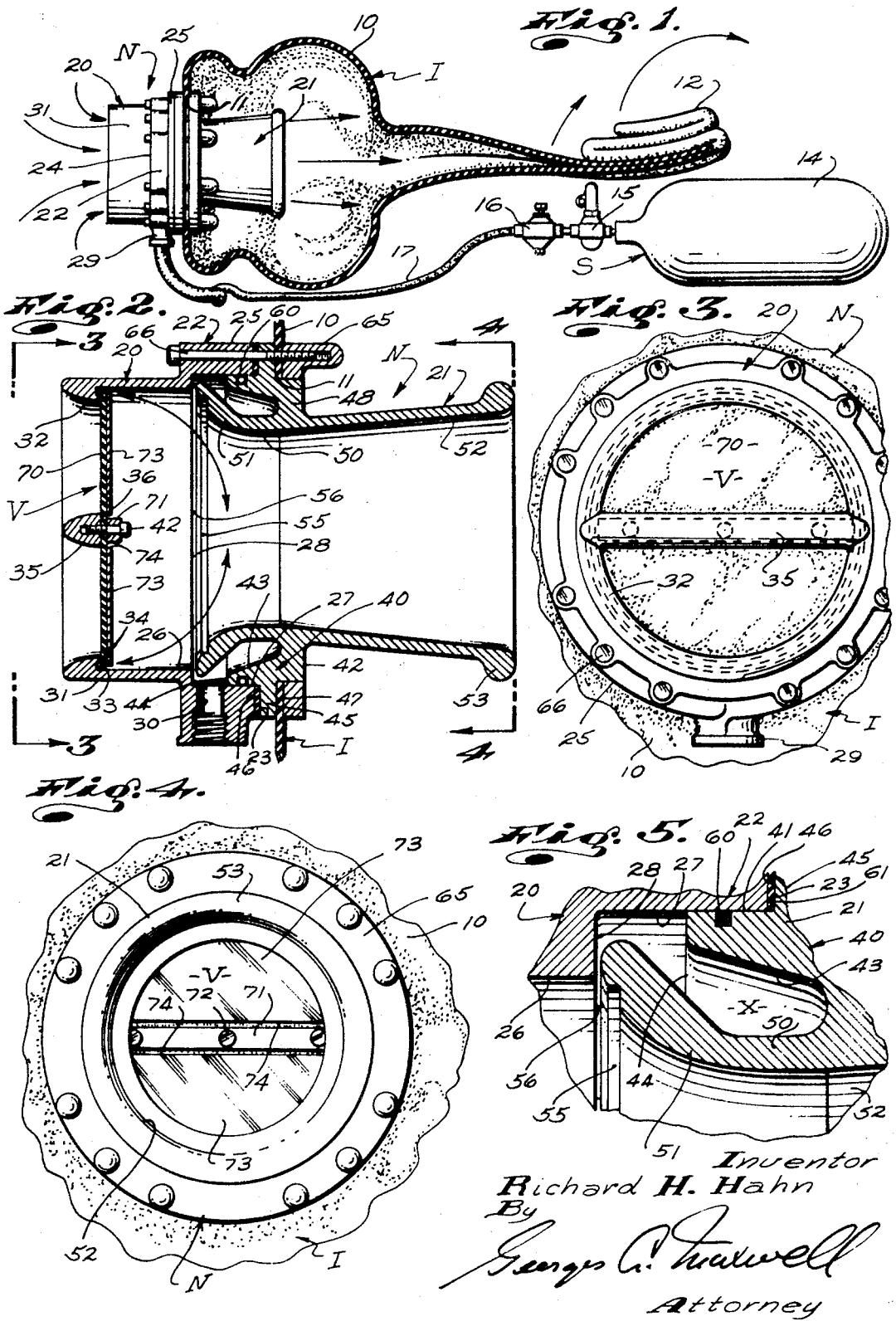

3,468,472
FLOW AUGMENTED NOZZLE
Richard H. Hahn, Burbank, Calif., assignor to Global Systems, Inc., Sun Valley, Calif., a corporation of Delaware
Filed Sept. 15, 1967, Ser. No. 668,002
Int. Cl. F04f 5/16, 5/48; F16k 15/20
U.S. Cl. 230—95                                      8 Claims

ABSTRACT OF THE DISCLOSURE

A flow augmented Coanda nozzle for engagement in an opening in a wall of an inflatable structure and connection with a supply of high pressure gas comprising an elongate sectional construction having front and rear ends and defining an elongate forwardly opening cylindrical air inlet flow passage with a rear end terminating in the forward portion of the construction, a cylindrical throat of lesser diametric extent than the air inlet flow passage spaced rearward of and concentric with said air inlet flow passage and having a forwardly and radially outwardly projecting bell portion, the forward outer portion of which is greater in diametric extent than the air inlet passage and terminates in predetermined spaced relationship rearward of the rear ends of the air passage and defining an annular radially inwardly opening gas inlet flow passage, an annular plenum chamber radially outward of the throat and communicating with said gas inlet passage and an elongate, cylindrical, rearwardly divergent and rearwardly opening defuser flow passage extending rearwardly from the throat, annular coupling means about the exterior of the nozzle, forward of the rear end of the defuser flow passage to engage in and seal with an opening in a wall of an inflatable structure and connecting means to connect with a supply of high pressure gas and communicating with the plenum chamber.

---

This invention relates to a novel aspirator and is more particularly concerned with an aspirator construction to inflate large inflatable structures with a large volume of air and/or gas, at relatively low pressures by means of a small volume of bottled air or gas at high pressure.

The aspirator which is the subject of the present invention is of novel construction and operation in that it employs a Coanda effect and for the purpose of this disclosure can be better identified and referred to as a "flow augmented Coanda nozzle."

Throughout the many arts there are an increasing number of situations where large inflatable structures are provided, many of which structures are adapted to be carried by various forms of craft and/or vehicles, from place to place and which must be provided with independent means for inflating the same. Typical of such inflatable structures are: inflatable igloo type emergency shelters, as might be used by the military medical corps, and escape chutes for large passenger aircraft and down which passengers can slide to safety, from grounded, disabled aircraft.

Such inflatable structures are established of thin, light weight rubberized or plasticized impervious fabric sheeting, or the like. The material or fabric sheeting is arranged and assembled in such a manner as to establish air cells which define wall surfaces, panels, supporting beam structures and the like, when inflated. Such structures are such that when not in use air is evacuated therefrom and they are folded into small, light, neat and compact packages.

Inflatable structures of the character referred to are normally intended for use in emergencies. Accordingly, they must be easy and convenient to transport from place to place and must establish light, small and compact units when not in use.

Since such inflatable structures are of considerable size and extent when in use, it will be apparent that a considerable volume of air and/or gas is required to inflate them.

The use of mechanical air pumps and the like, to inflate such structures has been tried, but such means are inherently too large and heavy, are not fast enough in operation and are subject to failure.

A direct supply of bottled gas or air, under great pressure has proven more satisfactory than mechanical air pumps and the like, but is not wholly satisfactory as the volume of gas or air required to inflate the structures is considerable and requires an excessively large and heavy flask or cylinder of compressed gas or air in order to effect complete and satisfactory inflation of the structure.

As a result of the above, the prior art has provided such inflatable emergency structures with aspirators at the inlet openings of the structures and has provided small and light cylinders of gas under high pressure to supply the aspirator. The small volumes of high pressure gas thus provided is introduced into the inflatable structures through the aspirators and serves to draw ambient air through the aspirators and into the inflatable structures. Accordingly, a small volume high pressure gas effects the introduction of a large, relatively low pressure, volume of gas and air into the inflatable structures, as is desired or required.

The aspirators provided by the prior art are of the most elementary order and are of questionable effectiveness and efficiency. Such aspirators involve generally an elongate flow tube with inner and outer ends, mounting means to mount the tubes in openings in their related inflatable structures, with their inner ends communicating with the interiors of said structures. One or more inwardly disposed nozzles are provided at or adjacent the outer ends of the tubes and communicate with the cylinders of gas. The systems are ordinarily under control of a suitable manually operable valve. The nozzle or nozzles direct jets of high pressure gas inwardly through the tubes. The gas jets colliding with ambient air induce an inward flow of ambient air through the tube and into the inflatable structure.

Many attempts have been made to sophisticate such aspirators and make them more efficient and effective, but such attempts have met with limited success and have not resulted in a material departure from the basic, "tube-nozzle-jet," concept.

A number of such aspirators have been provided with valve means to close the flow tubes, when the supply of gas is exhausted and to prevent deflation of the structures with which they are related. Such valve means have involved simple spring loaded flapper valve members at the inner or discharge ends of the flow tubes, which valve members normally overlie the ends of the tubes and are pivoted open by the force of the jets of gas impinging upon them. Such valve means, located at the rear ends of the flow tubes and rearwardly of the motive jets of gas, buffer the operation of such aspirators and adversely affect their efficiency.

The aspirators are arranged in their related inflatable structures so when the structures are folded and packaged the aspirators are at the outside of the package and accessible for connection with the gas supply and in communication with ambient atmosphere. The constructions are folded and packaged so that when gas is started to flow through the aspirators the packaged constructions unfold and open up automatically.

Providing flapper type valve means at the discharge ends of the aspirator flow tubes frequently results in packaging problems and requires providing the valve means with special housing and/or guard means which further adversely affect the efficiency of the aspirators.

An object of my invention is to provide an aspirator in the nature of a flow augmented Coanda nozzle for inflating inflatable structures of the general character referred to above.

Another object of my invention is to provide a nozzle of the general character referred to which is more effective and efficient than conventional aspirator constructions employed by the prior art for inflating inflatable structures and which is such that it can be advantageously used in place of and substituted for conventional aspirators.

It is another object of the present invention to provide a flow augmented Coanda nozzle particularly adapted to inflate inflatable structures with a large volume of gas and air at relatively low pressure by means of a small volume of gas at high pressure and which is provided with novel valve means to stop reverse flow of air and gas through the nozzle when the high pressure supply of gas is exhausted or shut off.

Yet another object of my invention is to provide a nozzle construction of the character referred to which involves a minimum number of parts, each of which is easy and economical to manufacture, a structure which is easy and economical to assemble, disassemble and maintain and a structure which is rugged durable and both highly effective and dependable in operation.

The above and other objects and features of my invention will be fully understood from the following detailed description of a typical preferred form and embodiment of my invention, throughout which description reference is made to the accompanying drawings in which:

FIG. 1 is an elevational view of my new nozzle showing it related to an inflatable structure and with a high pressure gas supply.

FIG. 2 is an enlarged detailed sectional view of my new nozzle.

FIG. 3 is a front end view taken as indicated by line 3—3 on FIG. 1.

FIG. 4 is a rear end view taken as indicated by line 4—4 on FIG. 2, and

FIG. 5 is an enlarged detailed sectional view of a portion of the structure shown in FIG. 2.

The aspirator or flow augmented Coanda nozzle N that I provide is adapted to be related to an inflatable structure I and is adapted to be connected with a supply means S of high pressure gas.

The inflatable structure I can be of any suitable design and is characterized by thin, flexible, impervious walls 10 of rubberized fabric or the like and in which an inlet opening 11 is provided to receive the nozzle N. The structure I is normally exhausted of air or gas and is folded up, as indicated at 12 at the right hand side of the drawing, to establish a small package. The structure I is adapted to be unfolded and inflated by the introduction of gas and air into said structure through the nozzle N as indicated at the left hand side of FIG. 1 of the drawings. The structure I is designed to be fully inflated and to provide the desired structural stiffness and support when fully inflated and under relatively low pressure, say for example two and a half p.s.i.

The supply means S of high pressure gas includes a cylinder 14 of high pressure gas, a normally closed manually operable release valve 15 controlling the flow of gas from the cylinder, a pressure regulator 16 at the discharge side of the valve 15 and a flexible gas conducting hose 17 extending from and between the discharge side of the regulator 16 and the nozzle N.

The cylinder 14 is very small relative to the ultimate size and extent of the structure I and holds considerably less gas than would be required to inflate the structure I to its designed extent and pressure.

In practice, the cylinder 14 with its related valve 15 and pressure regulator 16 can be arranged in any desired manner and position relative to the nozzle N and the structure I and in any necessary or desired manner with and relative to any secondary carrying or supporting structure with which the nozzle N and structure I might be related.

The nozzle N is a rather small assembly made up of two elongate axially aligned sections, there being a front section 20 and a rear section 21.

The front section 20 has an annular, ring like rear body portion 22 with a flat rearwardly disposed rear surface 23, a front end 24, a cylindrical outer surface 25, a central opening or flow passage 26 and a central rearwardly opening cylindrical socket 27 entering the rear surface 22 and terminating at a flat radially extending, rearwardly disposed, annular bottom 28.

The rear body portion 22 is further provided with a radially outwardly projecting cylindrical boss 29 with a radially extending, radially inwardly and outwardly opening inlet passage 30. The outer end of the passage 30 is internally threaded or otherwise constructed to receive a suitable fitting on the downstream end of the flexible hose 17 of the means S.

The front section 20 is further provided with a front tubular air inlet tube portion 31 which is smaller in outside diameter than the outside diameter of the body portion and which corresponds in inside diameter with the flow passage 26 and constitutes a forward extension of said flow passage.

The forward terminal end of the tube portion 31 is provided with an annular radially inwardly projecting flange 32 with a flat rearwardly disposed surface 33 having an annular axially rearwardly projecting sealing bead 34 about its inner peripheral edge. The radial inner side and forward end of the flange 32 is aerodynamically curved forwardly and radially outwardly and thence radially outwardly and rearwardly to present a streamlined leading edge on the section 20.

In addition to the foregoing, the section 20 is provided with a central radially extending carrier bar 35 extending transverse the flange 32 and having a flat rear surface 36 and front and side surfaces suitably aerodynamically curved and/or rounded.

The front tube portion with its annular sealing bead 34 and carrier bar 35 is adapted to accomodate and carry a suitable valve means V, the details of which will be hereinafter described.

The rear section 21 of the nozzle includes an elongate annular ring like body portion 40 with a cylindrical outer surface 41 corresponding in diametric extent with the socket 27 in the front section a rear surface 42, a radially inwardly and rearwardly inclined inner surface 43 and a forward or front end 44. The body portion 40 has a radially outwardly projecting mounting or flange 45 intermediate its ends, corresponding in outside diameter with the outside diameter of the body portion 22 of the section 20 and defining flat axially disposed front and rear surfaces 46 and 47.

The body portion 40 is further provided with a radially inwardly projecting support flange 48 at its rear end.

In addition to the foregoing, the section 21 includes a tubular throat 50 carried by and projecting forwardly from the flange 48 and having a forwardly and radially outwardly curved forward bell or bell portion 51 at its forward end. The forward outer peripheral edge of the bell or bell portion 51 is larger in diametric extent than the flow passage 26 in the section 20 and is less in diametric extent than the socket 27 in the section 20. The outer peripheral edge of the bell or bell portion 51 is suitably rounded.

The section 21 further includes an elongate rearwardly projecting rearwardly and radially outwardly divergent horn like defuser tube 52 projecting rearwardly from the flange 48 and continuing rearwardly from the throat 50. The rear end of the defuser horn or tube 52 is provided with a suitable round bead 53 so as to eliminate the presence of any sharp corners and the like which might cut or otherwise damage the structure I.

Finally, the bell or bell portion 51 of the nozzle N is provided with a forwardly and radially inwardly opening annular release groove 55 in the forwardly and radially inwardly disposed surface of the outer peripheral portion thereof.

The portion of the body 40 of the section 21, occurring forward of the flange 45 is slidably engaged in the bore 27 of the section 20 and to a position where the front surface 46 of the flange 45 stops against the rear surface 23 of the section 20. When the section 21 is engaged in and with the section 20 in the manner set forth above, the outer forward end of the bell or bell portion 51 of the section 21 occurs in predetermined spaced relationship rearward of the annular bottom 28 of the bore 27.

It is to be noted that the throat 50 is spaced radially inward of the inner surface 43 of the body portion 40 of section 21 and that the forward bell portion 51 of the throat extends forwardly and radially outwardly about the front end 44 of said body portion 40 and in spaced relationship therefrom. It will also be apparent that when the sections 20 and 21 are engaged with each other in the manner set forth above the forward outer end of the bell portion 51 is spaced radially inward of the bore 27 and the front end 44 of the body portion 40 of the section 21 is spaced rearward of the bottom 28 of the bore 27. With this relationship of parts and as clearly illustrated in FIGS. 2 and 5 of the drawings the body 40, throat 50 with its bell portion 51, cooperate with the bore 27 and the bottom 28 thereof to define an annular plenum chamber X with which the passage 30 in the section 20 and with which the gas supply means S is connected, communicates.

It is also to be noted that the axial rearward spacing of the forward outer end of the bell portion 51 from the bottom 28 of the bore 27 establishes a radially inwardly opening annular flow passage 56 communicating between the plenum chamber X and flow passage 26, at the forward outer edge of the bell portion 51. Accordingly, high pressure gas introduced into the chamber X through the passage 30 and flowing uniformly therethrough is directed radially inwardly about the outer forward end of the bell portion 51 of the throat 50.

In practice and as illustrated in the drawings, suitable sealing means 60 can be provided between the body portion 40 of the section 21 and the bore 27 in the section 20.

Further, if desired and as illustrated in the drawings, a suitable annular shim 61 can be provided between the rear surface 23 of the section 20 and the front surface 46 on the flange 35 of section 21 to properly space the forward end of the bell portion 51 from the bottom 28 of the bore 27. The use of such a shim makes possible varying or adjustment of the extent or size of the annular flow passage 56.

The portion of the body 40 of section 21 occurring rearward of the flange 45 is slidably engaged in the opening 11 in the wall 10 of the inflatable structure I and a suitable clamp ring 65 is engaged about the body portion 40, rearward of the wall 10 of the structure I. The body portion 22 of the section 20, the flange 45 of the section 21, the portion of the wall 10 about the opening 11 and the ring 65 are provided with a plurality of circumferentially spaced axially aligned openings in and through which suitable tie bolts 66 are engaged to releasably hold the several related parts in tight clamped assembled relationship with each other.

It is to be understood that the bolt means and the manner in which the wall 10 of the structure I is shown related and fixed with the nozzle construction N is only illustrative of one carrying out of the invention and that in practice these details of construction can be varied widely without departing from the spirit of this invention.

The valve means V referred to in the foregoing includes a unitary, flat, rubber or rubberized fabric disc 70. The disc 70 is slightly smaller in diametric extent than the flow passage 26 and is arranged in the forward portion of the air inlet tube portion 31 of the section 20 to extend transversely thereof and to occur in flat bearing engagement on the rear surface 36 of the bar 35. The outer peripheral portion of the disc normally establishes bearing and sealing engagement on the rearwardly projecting annular sealing lip 34 on the flange 32 provided at the forward end of the tube portion 31.

The disc 70 is held in tight clamped engagement on the bar 35 by means of a retainer bar 71 extending across the rear surface of the disc and held in tight clamped engagement thereon by suitable screw fasteners 72 carried by said retainer bar and engaged through the disc and in the bar 35.

The radial extent of the rear surface of the disc 70 is bisected or divided by the retainer bar 71 and each half thereof, that is, each half of the rear surface of the disc occurring at opposite sides of the bar 71 is provided with a flat, substantially half round or segmental stiffener or reinforcing plate 73. The stiffener plates 73 are preferably established of a rigid light weight material, such as aluminum and are secured to their related portions of the disc 70 as by means of a suitable cement. The inner substantially radially extending chordal edges 74 of the plates 73 are spaced a sufficient distance from their related or opposing sides of the bar 71 so that the portions of the disc 70 therebetween establish flexible resilient hinge means and allow for rearward pivoting of the reinforced halves of the disc, as illustrated by the arrows in FIG. 2 of the drawings.

In light of the above, it will be apparent that the valve means V involves a pair of half round flapper valve members pivotally mounted in the forward end of the tube portion of the front section of the nozzle to normally engage and seat on the rearwardly projecting sealing bead about said tube portion and are adapted to pivot rearwardly in said tube portion and away from said sealing bead when inward or rearward flow of air is established through said tube portion. It will be further apparent that forward flow or movement of air in and through the nozzle construction tends to urge the valve means closed and is therefore checked by said valve means.

In practice, the configuration of the bell portion, the angle at which the defuser tube 52 diverges, the relative cross-sectional areas of the throat and the annular flow passage 56 and other design features and characteristics of the construction can vary considerably and, for maximum effectiveness and efficiency, must be carefully designed in view of other controlling factors such as space limitations, the pressure and volume of the gas supply, the back pressures to be encountered and other such environmental factors.

In operation, when the valve 15 of the means S is opened to inflate the structure I, high pressure gas, under control of the regulator 16 flows through the line 17 and into the plenum chamber X of the nozzle N. (For example, at 100 p.s.i.) The high pressure gas flows through the annular flow passage 56 and into the flow passage 26, the throat 50, defuser tube 52 and into the structure I, which structure is in a folded condition.

Initially, the valve means V rests in a substantially closed condition. If the inflatable structure I is tightly packed, upon commencing the flow of gas into the nozzle, the structure I creates a sufficient back pressure in the set-up to close the valve and to thereby create a positive pressure within the nozzle which urges and causes the structure I to commence to unfold and open up. As soon as the structure I starts unfolding the noted back pressure is released and a rearward flow of gas through the construction is induced. The induced rearward flow of gas creates a minus pressure in the flow passage 26. At this time, atmospheric pressure urges the valve means V open and a rearward flow of ambient air is induced into and through the nozzle construction.

The flow of high pressure gas through the annular flow passage 56 emerges into the flow passage 26 at the forward end of the bell portion of the throat 50 in the form of a radially inwardly flowing jet. This jet has a certain predetermined momentum or product of mass flow or velocity which is determined by the area of the flow passage 56 and the pressure drop across it.

The jet flow tends to produce a low pressure region in the vicinity of the flow passage 56 and bell portion 51 of the throat so that surrounding gases flow toward the jet and become entrapped by it.

As mixing of the gases in the above manner takes place, the average velocity of the flow decreases and the mass increases until, at some distance away from the flow passage 56, the jet dissipates in random motion of gas or fluid particles.

The inner surface of the throat, including the aerodynamically curved bell portion 51 thereof creates the boundary in immediate juxtaposition to the rear side of the jet, which boundary hampers induced flow of gases (air) in the construction at the rear side of the jet. This leads to a region of reduced pressure between the jet and the bell portion 51 of the throat and causes rearward deflection of the jet until the jet lies on the boundary or surface of the throat, that is on the surface of the throat with a region of greater reduced pressure right at the said surface or boundary.

With the jet thus deflected, a pressure gradient across the jet is created which gradient creates a static pressure field similar to that created by flow past an air foil. This induces a secondary flow of considerable magnitude centrally through the nodzle construction and, depending on the geometry employed, either high static lift or high mass-flow rates may be developed.

Because of the momentum augmentation in the primary flow and because the secondary flow is induced by a pressure field rather than by less efficient collision processes such as are employed by aspirators provided by the prior art, the total flow produced by the deflected jet is characterized by substantial momentum augmentation and by a high degree of energy transfer efficiency.

The relief groove 55 in the forward surface of the bell portion 51 of the throat 50 is arranged or positioned at the point of lowest pressure and creates a vortex of increased or stronger minus pressures which positively deflects the jet towards and into intimate contact with the surface of the throat, preventing the presence of an impeding boundary layer of gases between the jet and the surface of the throat.

The high pressure gas, acted upon in the manner set forth above and inducing the flow of ambient air through the construction continues to flow rearwardly through the throat and the defuser tube portion 52 of the section 20 and in like intimate relationship with the inner surface of said defuser tube portion.

By the time the gas and the air reaches the rear discharge end of the defuser tube, the jet has substantially dissipated in random motion with the air and the work energy thereof has been substantially spent.

When and as the pressure in the inflatable structure I reaches a predetermined amount and/or the pressure of the supply of gas drops and so that the differential of these pressures drops to an extent that the nozzle ceases to function effectively, and the flow of ambient air into the nozzle ceases, the internal pressures cause the valve means V to close. Subsequent to the valve means closing, the supply of gas continues to flow into the nozzle and the structure I until the supply is exhausted.

From the foregoing, it will be apparent that the nozzle functions as an aspirator to inflate the structure I to a predetermined pressure, for example 2 p.s.i., and where it is urged to its substantially full extent, whereupon the nozzle ceases to aspirate and the valve means V closes. Subsequently, the gas supply is permitted to exhaust into the structure I and serves to bring the pressure therein up to the desired predetermined fully inflated pressure, for example 3 p.s.i.

In order that the above function can take place, it is necessary that the valve means V be arranged at the forward end of the nozzle, as illustrated.

Once the supply of gas is exhausted and the structure I is fully inflated, the internal pressure acting on the valve means V maintains the valve means closed.

If it is necessary or desired to deflate or soften the structure I slightly and when it is desired to completely deflate the structure I, the valve means is conveniently accessible for engagement of the valve members thereof with one's fingers for the purpose of manually urging the valve open, as desired or as circumstances require.

Having described only a typical preferred form and application of my invention, I do not wish to be limited to the specific details herein set forth, but wish to reserve to myself any modifications and/or variations that may appear to those skilled in the art and which fall within the scope of the following claims.

Having described by invention, I claim:

1. A flow augmented Coanda nozzle for engagement in an opening in a wall of an inflatable structure and connection with a supply of high pressure gas comprising an elongate sectional construction having front and rear ends and defining an elongate forwardly opening cylindrical air inlet flow passage with a rear end terminating in the forward portion of the construction, a cylindrical throat of lesser diametric extent than the air inlet flow passage spaced rearward of and concentric with said air inlet flow passage and having a forwardly and radially outwardly projecting bell portion, the forward outer portion of which is greater in diametric extent than the air inlet passage and terminates in predetermined spaced relationship rearward of the rear end of the air passage to define an annular radially inwardly opening gas inlet flow passage, an annular plenum chamber radially outward of and communicating with said gas inlet passage and an elongate, cylindrical, rearwardly divergent and rearwardly opening defuser flow passage extending rearwardly from the throat, coupling means about the exterior of the nozzle, forward of the rear end of the defuser flow passage to engage in and seal with an opening in a wall of an inflatable structure and connecting means to connect with a supply of high pressure gas and communicating with the plenum chamber, said bell portion having an axially forwardly and radially inwardly opening annular relief groove in predetermined radial inward spaced relationship from the outer periphery of said bell portion, said relief groove adapted to cooperate with gas flowing radially inwardly through the inlet flow passage to create a minus pressure rearward of the inlet flow passage, which minus pressure draws said gas axially rearwardly into the bell portion.

2. A flow augmented Coanda nozzle for engagement in an opening in a wall of an inflatable structure and connection with a supply of high pressure gas comprising an elongate sectional construction having front and rear ends and defining an elongate forwardly opening cylindrical air inlet flow passage with a rear end terminating in the forward portion of the construction, a cylindrical throat of lesser diametric extent than the air inlet flow passage spaced rearward of and concentric with said air inlet flow passage and having a forwardly and radially outwardly projecting bell portion, the forward outer portion of which is greater in diametric extent than the air inlet passage and terminates in predetermined spaced relationship rearward of the rear end of the air passage to define an annular radially inwardly opening gas inlet flow passage, an annular plenum chamber radially outward of and communicating with said gas inlet passage and an elongate, cylindrical, rearwardly divergent and rearwardly opening defuser flow passage extending rearwardly from the throat, coupling means about the exterior of the nozzle, forward of the rear end of the defuser flow passage to engage in and seal with an opening in a wall of an inflatable structure and connecting means to connect with a supply high pressure gas and communicating with the plenum chamber, and gas pressure actuated valve means at the forward end of the air inlet flow passage to allow for free longitudinal rearward flow of air into and through the nozzle and to check forward flow of air therethrough, said valve means being responsive to differential in pressure within the nozzle and outside the nozzle, said bell portion of said throat having an axially forwardly and radially inwardly opening annular relief groove in predetermined radial inward spaced relationship from the outer periphery of said bell portion, said relief groove adapted to cooperate with gas flowing radially inwardly through the inlet flow passage to create a minus pressure rearward of the inlet flow passage, which minus pressure draws said gas axially rearwardly into the bell portion.

3. A flow augmented Coanda nozzle for engagement in an opening in a wall of an inflatable structure and connection with a supply of high pressure gas comprising an elongate sectional construction having front and rear ends and defining an elongate forwardly opening cylindrical air inlet flow passage with a rear end terminating in the forward portion of the construction, a cylindrical throat of lesser diametric extent than the air inlet flow passage spaced rearward of and concentric with said air inlet flow passage and having a forwardly and radially outwardly projecting bell portion, the forward outer portion of which is greater in diametric extent than the air inlet passage and terminates in predetermined spaced relationship rearward of the rear end of the air passage to define an annular radially inwardly opening gas inlet flow passage, an annular plenum chamber radially outward of and communicating with said gas inlet passage and an elongate, cylindrical, rearwardly divergent and rearwardly opening defuser flow passage extending rearwardly from the throat, coupling means about the exterior of the nozzle, forward of the rear end of the defuser flow passage to engage in and seal with an opening in a wall of an inflatable structure and connecting means to connect with a supply of high pressure gas and communicating with the plenum chamber, valve means at the forward end of the air inlet flow passage to allow for free longitudinal rearward flow of air into and through the nozzle and to check forward flow of air therethrough, said valve means including an annular sealing bead about the forward end of the air inlet flow passage, a valve member pivotally mounted in the air inlet flow passage to normally extend transverse and to close said passage and engage the sealing bead, said valve member adapted to be pivoted longitudinally inwardly and away from said bead by sub-atmospheric pressures in the nozzle rearward of the valve means and by longitudinally inwardly flowing air in the air inlet flow passage.

4. A structure as set forth in claim 3 wherein said bell portion of said throat has an axially forwardly and radially inwardly opening annular relief groove in predetermined radial inward spaced relationship from the outer periphery.

5. A flow augmented Coanda nozzle for engagement in an opening in a wall of an inflatable structure and connection with a supply of high pressure gas comprising an elongate sectional construction having front and rear ends and defining an elongate forwardly opening cylindrical air inlet flow passage with a rear end terminating in the forward portion of the construction, a cylindrical throat of lesser diametric extent than the air inlet flow passage spaced rearward of and concentric with said air inlet flow passage and having a forwardly and radially outwardly projecting bell portion, the forward outer portion of which is greater in diametric extent than the air inlet passage and terminates in predetermined spaced relationship rearward of the rear end of the air passage to define an annular radially inwardly opening gas inlet flow passage, an annular plenum chamber radially outward of and communicating with said gas inlet passage and an elongate, cylindrical, rearwardly divergent and rearwardly opening defuser flow passage extending rearwardly from the throat, coupling means about the exterior of the nozzle, forward of the rear end of the defuser flow passage to engage in and seal with an opening in a wall of an inflatable structure and connecting means to connect with a supply of high pressure gas and communicating with the plenum chamber, elongate, longitudinally extending front and rear sections, said front section defining the air inlet flow passage and having an enlarged bore with a flat rearwardly disposed bottom entering its rear end, said rear section having an elongate annular body portion slidably engaged in the rear portion of the bore in the front section, a radially inwardly projecting flange on the rear end of the body portion, an elongate rear tube portion projecting rearwardly from said flange and defining the defuser flow passage and an elongate front tube portion projecting forwardly and thence radially outwardly from said flange and defining the throat and bell portion, the forward outer end of said front tube portion entering the bore in the front section and terminating in predetermined rearward spaced relationship from the bottom of said bore to define the annular gas inlet flow passage, said body portion, flange, front tube portion and the wall and the bottom of said bore cooperating to define the plenum chamber.

6. A structure as set forth in claim 5 wherein said bell portion has an axially forwardly and radially inwardly opening annular relief groove in predetermined radial inward spaced relationship from the outer periphery of said bell portion.

7. A structure as set forth in claim 5 including valve means at the forward end of the air inlet flow passage to allow for free longitudinal rearward flow of air into and through the nozzle and to check forward flow of air therethrough, said valve means including an annular sealing bead about the forward end of the air inlet flow passage, a valve member pivotally mounted in the air inlet flow passage to normally extend transverse and to close said passage and engaging the sealing bead and adapted to be pivoted longitudinally inwardly and away from said bead by sub-atmospheric pressures in the nozzle rearward of the valve means and by longitudinally inwardly flowing air in the air inlet flow passage.

8. A structure as set forth in claim 5 wherein said bell portion has an axially forwardly and radially inwardly opening annular relief groove in predetermined radial inwardly spaced relationship from the outer periphery of said bell portion, and valve means at the forward end of the air inlet flow passage to allow for free longitudinal rearward flow of air into and through the nozzle and to check forward flow of air therethrough, said valve means including an annular sealing bead about the forward end of the air inlet flow passage, a valve member pivotally mounted in the air inlet flow passage to normally extend transverse and to close said passage and engage the sealing bead and adapted to be pivoted longitudinally inwardly and away from said bead by sub-atmospheric pressures in the nozzle rearward of the valve means and by longitudinally inwardly flowing air in the air inlet flow passage.

References Cited

UNITED STATES PATENTS

| | | | |
|---|---|---|---|
| 2,399,670 | 5/1946 | Freygang | 230—92 X |
| 2,746,078 | 5/1956 | Spurlin | 230—95 X |
| 2,772,829 | 12/1956 | Crawford et al. | 230—95 |
| 2,988,139 | 6/1961 | Coanda | 230—95 X |
| 3,031,127 | 4/1962 | Duhaime et al. | 230—95 |
| 3,042,290 | 7/1962 | Fraebel | 230—95 X |
| 3,368,302 | 2/1968 | Martino | 137—223 X |
| 3,370,784 | 2/1968 | Day | 137—223 X |

DONLEY J. STOCKING, Primary Examiner

WARREN J. KRAUSS, Assistant Examiner

U.S. Cl. X.R.

137—223